UNITED STATES PATENT OFFICE 2,213,542

TITANIUM PIGMENT PRODUCTION

James Eliot Booge, Wilmington, Del., assignor to E. I. du Pont de Nemours & Company, Wilmington, Del., a corporation of Delaware No Drawing. Application June 22, 1938, Serial No. 215,219

15 Claims. (Cl. 134—58)

This invention relates to improved titanium dioxide pigments and to processes for their manufacture. More particularly, it relates to white titanium dioxide pigments having high durability characteristics, and to novel methods for producing the same. Still more particularly, it relates to a process for the preparation of an improved chalking and fading resistant titanium dioxide in substantially rutile crystalline modification by conversion from the anatase modification. More specifically, the invention involves the production of a titanium dioxide pigment in substantially rutile crystalline modification, intimately combined with relatively small amounts of lead titanate crystals, the pigment being in such physical and chemical state as to possess excellent durability characteristics upon prolonged exposure to the outdoor elements and relatively complete freedom from the tendency which prior titanium dioxide pigments exhibit towards chalking and fading failures.

The ideal, commercially useful titanium dioxide pigment adapted to both interior and exterior coating compositions, must retain not only such valuable properties as inertness, color, brightness and hiding power, but must also impart to the coating desired tint retention and be free from any tendency to chalk or fade. Titanium dioxide occurs in three crystalline forms, i. e., anatase, brookite, and rutile, having respective refractive indices of 2.52, 2.64 and 2.71. Previous commercial titanium dioxide pigments are characterized by the anatase crystalline structure, which is in the form of the lowest refractive index. These anatase pigments are characteristically porous in structure, very fine in particle size, and extremely irregular of surface. They chalk and fade badly and with extreme rapidity, especially when employed in exterior applications which must be subjected to atmospheric or other deteriorating influences. When such pigments are formulated in linseed oil paints of high covering power and exposed to the elements, disintegration of the paint film occurs within a very short time, being manifested by the appearance of numerous particles of loosely-held pigment on the surface of the film, which is characterized as "chalking" in the art.

If the white pigment has been tinted to a color by means of a colored pigment, or to gray by means of lamp black, the chalk particles of white pigment on the surface of the tinted paint film obscure the color of the underlying surface and the paint then presents a blotchy, unsightly appearance, some areas thereof having "faded" or "lost" the original color to become "whiter." Consequently, titanium dioxide pigment use is seriously limited in paints and coating compositions, and especially in those designed to cover surfaces for either protection or ornamentation which require outdoor exposures.

Various attempts have been made previously to obtain titanium pigments useful for both interior and exterior applications from anatase titanium dioxide or by conversion of the same to rutile. None, however, has proved successful or adapted to the production of a product which is satisfactorily suited for the intended pigment use. Due to the conversion or other conditions prevailing in such processes, the product therefrom is either a very unsatisfactory color, exhibits objectionable chalking and fading failures when employed in exterior applications, or does not possess that desired and complete combination of essential pigmentary properties which is requisite to a titanium dioxide pigment adaptable to all manners and types of commercial usage.

It is among the objects of this invention to overcome these deficiencies in prior titanium pigments and to produce an improved type of titanium dioxide pigment which will possess all of the essential pigment characteristics already alluded to. A further object of the invention includes the production of a white titanium dioxide pigment of markedly improved and superior stability, and one which will exhibit relatively complete freedom from any tendency towards fading or chalking, particularly when employed in coating formulations to be subjected to outdoor exposures. A further and specific object of the invention includes the production of an improved titanium dioxide pigment in substantially rutile, crystalline modification and containing relatively small amounts of lead in the form of a titanate. An additional object includes the production of a weather-resistant, rutile-converted titanium dioxide pigment containing relatively minor quantities of lead titanate crystals. A further object includes the production of an improved titanium pigment of characteristically uniform, relatively large and coarse particle size average; of satisfactory and improved color, high tinting strength and hiding power, and which exhibits other desirable pigmentary properties such as essential and satisfactory oil absorption, brightness, inertness, etc.

These and other objects are afforded by this invention, which broadly comprises calcining titanium dioxide in the presence of relatively small amounts of a compound of lead, and maintaining the conditions of calcination such that the resultant product comprises substantially rutile and minor quantities of lead titanate crystals.

In a more specific and preferred sense, the invention comprises initially subjecting anatase titanium dioxide to calcination to first develop desired pigment properties, such as tinting strength, hiding power, color, oil absorption, etc. (but under such conditions as will inhibit transformation of the anatase to rutile), and thereafter recalcining the pigment developed product in the presence of relatively small or minor quantities of a compound of lead, but under such conditions as will effect conversion of the anatase to rutile and intimately combine with the product small amounts of lead titanate crystals.

Having broadly referred to the underlying principles of this invention, a description of the various pigmentary terms employed herein to describe the novel pigments of the present invention, together with methods which have been employed in effecting such determinations, will now be set forth and in order that a more complete understanding of the invention will be had:

Durability

For purposes of the present invention, durability may be described as the resistance which a pigment exhibits towards fading and chalking when tested in paints employed in exterior exposures and automotive finishes.

In determining the durability and non-fading or non-chalking characteristics of the pigments of the present invention, an outside house paint formulation was selected, consisting of a linseed oil vehicle containing 92% acid refined linseed oil and 8% of bodied linseed oil. Pigmentation was at 28.5% pigment volume and the titanium pigment made up 24.4% of the weight of the pigment. A 35% leaded zinc oxide and fibrous magnesium silicate (36.6% of the former and 39% of the latter) made up the remainder of the white pigment portion of the paint. The paints were ground on a three-roll paint mill at optimum paint grinding consistency and later thinned with the remainder of the oil and the proper amount of mineral spirits. Tinting to standard gray and buff tints was made with the proper paste colors and were exposed along with the whites.

Exposure tests of these paints were made on edge grained white pine panels. Three coats of paint were applied to each panel, using a standard recommended reduction for first and second coats (½ pint turpentine plus 1 pint of raw linseed oil for the first coat, and 1 pint of turpentine plus ½ pint of linseed oil for the second coat). The third coat was applied unreduced. These panels were exposed for direct comparison with similar panels containing standard titanium dioxide, extensively employed in the industry, on both vertical and 45° inclined Delaware fences facing south and also on 45° south Florida fences.

Determination of the durability characteristics of the pigments of the present invention in automotive finishes was also made, and in direct comparison with standard $Sb_2O_3$-$TiO_2$ pigments employed in such finishes. The pigments were formulated in an automotive finish of the well known polyhydric alcohol-polybasic acid type, the formulation comprising 23% pigment, 31% of a drying oil modified polyhydric alcohol-polybasic acid resin, and 46% solvent. The enamels were prepared by grinding in pebble mills followed by addition of 0.07% cobalt drier as metal, tinting to the desired shade, and thinning with additional solvent for spray application. The enamels were applied on undercoated steel panels which were exposed to Florida sunshine on a 45° S fence.

In grading the exposed panels for chalking and fading, an arbitrarily selected numerical scale was adopted, running from 0 to 18,—"0" representing no fading and "18", very extreme fading. A difference of one point on the scale is material.

Absolute reflectance or brightness

Reflectance is the ratio of light reflection from the sample to be tested to light reflected from standard MgO under conditions of equal and essentially diffuse illumination, and as viewed from a direction normal to the surface of the sample. The spectral reflection characteristics of the pigments of the instant invention have been measured by a so-called Hardy Recording Photoelectric Spectrophotometer, a detailed description of which instrument and methods for operating the same are found in "Physical and Chemical Examination of Paints, Varnishes, Lacquers, Colors" by Gardner, 8th edition, January 1937, pp. 135–136; Journal of Optical Society of America, vol. 25, pp. 305–311, September 1935, and vol. 23, p. 359 (1933).

The apparatus is so constructed that the light reflected from the surface of a solid material may be the basis of a curve drawn at the time of the measurement. Mono-chromatic light is used and readings are possible throughout the visible spectrum with light ranging from 400–700 millimicrons. By use of the 1931 C. I. E. Standard and Coordinate System, curve values for dominant wave lengths in millimicrons, % Excitation purity, % Brightness, the Tri-Chromatic Coefficients and Tri-Stimulus Values are calculated.

The samples were prepared for test by pressing the pigments into a pillbox holder against a glass plate to obtain a smooth, homogeneous surface, and the surface of the pressed powders examined directly in the Hardy P. E. Recording Spectrophotometer.

The surface of the pressed powder sample is illuminated normally by monochromatic light and the amount of light reflected diffusely, relative to the amount of the same light reflected in the same manner from a surface of magnesium oxide, is a measure of the percent reflectance of the sample at the wavelength used. The sample is examined at all wavelengths, in turn, throughout the visible spectrum, and the values of reflectance at each wavelength form a continuous curve, referred to as a spectrophotometric curve.

By use of the 1931 C. I. E. Standard Observer and Coordinate System and E. I. E. Illuminant "C", values may be calculated from the spectrophotometric curve that describe the sample in much the same manner as it would appear visually to a normal observer, where illuminated by north sky light. The values of Dominant Wavelength (in millimicrons), % Excitation Purity, and % Brightness have been so calculated from the curves of the samples, and these values correspond approximately to the terms hue (whether red, yellow, green, or blue), saturation (how blue, how red, etc.), and brilliance (whether a "dark" or a "light" shade), respectively.

Color

Color is the apparent brightness and tint of the pigment in an oil paste, as measured relative to a standard similarly prepared as is expressed in units on an arbitrary scale.

The procedure followed in testing the pigments of the instant invention is essentially that described by J. E. Booge and H. E. Eastlack in the Paint, Oil and Chemical Review, April 9, 1924. Briefly, this comprises mulling the pigment with acid refined linseed oil of acid number 12.5 to form a thick paste. The sample to be tested and the standard are placed beside each other on a microscopic slide 2" x 3" in daubs about 1½" x 1". The daubs should be in sharp contact without air bubbles in the contact line and should be sufficiently thick to cut off all transmitted light. The pastes are then graded under north sky light for difference in appearance. The minimum perceptible difference in brightness is called one point of color. The sample is graded in full points from the standard. Differences in tint are important. In the case of white pigments a yellowish cast of the sample is penalized in the grading to the extent of one or more points, depending on whether it is barely perceptible or clearly evident. On the other hand, a bluish cast relative to the neutral standard is considered desirable and consequently modifies the grading upward.

The scale is selected in an arbitrary manner and values are given to several standard pigments within the useful range, a difference of one point being material. Salable pigments should rate above 8 or higher.

Tinting strength

Tinting strength is a measure of the effectiveness of a white pigment in covering up the tint of a colored pigment mixed with it. The property is relative in nature and results are obtained in comparison with another pigment used as a standard. These results depend on the standard for magnitude, but are independent of the standard for relative order.

The tinting strengths of the pigments produced in accordance with the instant invention were determined substantially in accordance with the method described by J. E. Booge and H. E. Eastlack in the Paint, Oil and Chemical Review, April 16, 1924. Briefly, pastes are prepared by mulling together the white pigment, ultramarine blue, and acid refined linseed oil of 12.5 acid number. The proportions used in determining the tinting strength of pigments of the invention were 3.0 grams of the titanium pigment, 1.0 gram of ultramarine blue and 1.5 cc. of oil. These ingredients were made into a paste with a spatula and mulled for 3 minutes with a 15 pound weighted muller.

Standards are prepared in the same manner except for the amount of blue which is increased or decreased proportionally as it is desired to prepare standards for lower or higher strength. The proportion of blue used in the standard paste to give any desired strength is inversely proportional to that strength. Thus, one standard is called arbitrarily 150 which corresponds to 1.0 gram of blue in the paste. The required amount for 140 strength is $$\frac{150}{140} \times 1.0 \text{ or } 1.0714 \text{ grams}$$

A standard titanium oxide pigment which was arbitrarily graded 150 was used. This pigment was of commercial quality similar to that regularly supplied to the paint industry at the present time.

The samples are graded by placing the sample paste on a microscope slide between standards of higher and lower strength (that is less or more deeply tinted) and not more than 5% apart in strength.

Hiding power

Hiding power may be defined qualitatively as that property of a paint which enables it to obliterate beyond recognition any background over which it is spread. Mathematically, it is usually expressed as square feet per gallon of paint.

The hiding power of a pigment may be calculated from the hiding power of the paint in which it is compounded by a simple calculation involving the figure for the weight of pigment per gallon of paint. It is expressed as the area in square centimeters covered per gram of pigment.

The equipment and methods used in determining hiding power values were substantially those described in Gardner's "Physical and Chemical Examination of Paints, Varnishes, Lacquers, Colors" (January 1937 Edition) page 45, et seq., entitled "Krebs Dry Film Incomplete Hiding Power."

Oil absorption

Oil absorption is the amount of oil in grams required to wet 100 grams of pigment.

The method of testing employed in determining oil absorption values is described in Gardner's Physical and Chemical Examination of Paints, Varnishes, Lacquers & Colors, 1933 edition, pp. 475-7.

A 5-gram sample is used, acid-refined linseed oil of 12.5 acid number is added slowly from a burette and worked into the pigment with a spatula on a smooth glass plate. The addition of oil is continued, a drop or two at a time, until the pigment can be collected in one coherent mass adhering to the spatula, but not wetting the glass. The amount of oil used to wet the pigment is read from the burette.

Particle size

Particle size, as employed herein, refers to the magnitude of the discrete particles making up the pigment. It is expressed usually as the arithmetical mean average diameter of the pigment particles.

The method employed for determining the same is outlined in the Proceedings of the Thirty-Sixth Annual Meeting of the American Society for Testing Materials, vol. 33, pp. 989-995 (1933). This comprises a photomicrographic method and reproducibility within satisfactory limits was found possible. Briefly, the pigments are dispersed in Canada balsam in the preparation of the slides. Photomicrographs are made at 1500X magnification, using a 90X apochromat objective and a 12.5X Huygenian ocular. A carbon arc with a Wratten #49 filter is employed as a source of light. Photographic prints are made with enlargement of 3⅓ times, giving an overall magnification of 5000 diameters.

For each pigment, at least 250 particles were measured in each of three representative fields. The horizontal diameters splitting the particles in half were measured in each case. The average diameters $d_1$ (arithmetical mean average) were then calculated using the relationships $$d_1 = \frac{\Sigma nd}{\Sigma n}$$

$\Sigma n$ representing the number of particles of any given mass.

Crystal Structure

As indicated, titanium dioxide occurs in three different crystalline forms, anatase, brookite, and rutile. Each crystal form has its characteristic X-ray diffraction pattern and present day technique is sufficiently developed to give semi-quantitative percentage values for mixtures of the modifications.

In determining the crystal structure of the pigments of the instant invention, the finely-divided pigment is placed in the path of a beam of X-rays and a diffraction pattern is obtained on a negative in the customary manner. The developed negatives are then compared to known standard patterns. Two or more patterns may be present on one negative and each can be identified in this comparison. By using the proper time of exposure, the contrast of the lines in the two patterns give a measure of the concentration of each component in the mixture. This estimation is made more accurate by preparing negatives of pigment mixtures of known concentrations of anatase, rutile, etc. and using these in the comparisons.

Having explained in some detail the terminology employed to describe the various pigmentary properties which the novel pigments of the present invention will characteristically exhibit, a description of one practical adaptation of said invention will now be undertaken.

In one preferred adaptation of the invention to obtain optimum benefits hereunder, I add to an aqueous slurry suspension of precipitated, calcined and pigment-developed anatase titanium dioxide about .1% to 2% of a soluble lead salt, such as solution of lead nitrate (said amounts being based on the weight of the pigment and calculated as PbO). I then agitate the whole mixture thoroughly in order to effect uniform incorporation and dispersion of the lead compound throughout the pigment. The pulp is then conveniently dewatered by filtering or evaporating to dryness, the dried mass being then calcined in a rotary type of kiln calciner at a temperature preferably in excess of 900° C. Usually a temperature of between about 925 and 950° C. suffices, the exact temperature chosen being dependent upon the amount of lead compound present. Calcination treatment is effected for a period of time sufficient to convert the anatase to its substantially complete rutile modification and to intimately and chemically combine therewith small amounts of lead titanate crystals. Alternatively, an insoluble compound of lead, such as litharge, may be directly incorporated with the slurry of titanium pigment, the resultant mixture being agitated violently or ground together to effect uniform and intimate mixture. If desired, a small quantity of a soluble lead salt such as about 0.2% $PbCl_2$ may be added to the aqueous suspension to promote interaction between the lead and titanium compound and effect the crystalline transformation during calcination. The thoroughly incorporated mixture is then dried by evaporation of the water and the dried mass subjected to calcination, as described. The calcined pigment is then finished by wet milling in a grinding apparatus, such as a ball mill, and is then filtered, dried and pulverized to break up lumps formed during drying. The pigment is then ready for direct incorporation in all types of paints and coating compositions. Suitable composite pigments possessing the improved properties imparted by the process of my invention may be prepared therefrom by blending well-known extenders therewith, such as barium sulfate, calcium sulfate, magnesium silicate, etc., which have desired bulking value and thickening effect in paints and coating compositions in which the improved pigment may be employed.

In order that the invention may be more clearly understood, the following specific and illustrative examples are given, none of which are to be considered as in imitation of my invention:

Example I 100 kg. of finely-divided calcined titanium dioxide are suspended in water to form a mobile slurry at a concentration of 250 gms. of $TiO_2$ per liter of suspension. To this suspension is added a solution containing 1.48 kg. of $Pb(NO_3)_2$ (equivalent to 1 kg. of PbO), dissolved in water and the aqueous mixture is agitated to insure complete mixing. The slurry is evaporated to dryness and the mixture is calcined for 30 minutes at a temperature of 950° C. The calcined product is wet ground, filtered, dried and pulverized. When the pigment properties of the product were determined in accordance with methods already described, its $TiO_2$ crystal structure was found to consist of the two crystal forms of rutile and octahedrite in the proportion of 4 to 1; its particle size average ($d_1$) was .42; its tinting strength value was 152; its oil absorption value was 18, and it had a color value of 14.

When used as a substitute for prior art anatase titanium oxide in a gray outside house paint running 28 parts of pigment by volume and 72 parts of linseed oil by volume, this pigment exhibited exceptional durability. The pigment portion of said paint was 24.4% $TiO_2$, 36.6% leaded zinc oxide (35% basic sulfate white lead), 39% fibrous magnesium silicate and a small amount of carbon black. The oil consisted of 92% alkali refined linseed oil and 8% of bodied linseed oil (viscosity Q). In making up the paint it was ground on a three roll paint mill using a portion of the oil and subsequently thinned with the remainder of the oil and the proper amount of metallic driers and mineral thinners. This paint was tested by exposing panels on both Florida and Delaware test fences and, when compared with a similarly prepared control paint using prior art anatase $TiO_2$, was found to show superior fading resistance in all tests including twelve months on a Florida 45° fence facing south (the most severe test).

Example II

The operation of Example I was duplicated except for the calcination temperature. The latter was 50° higher than in the preceding example. The product was finished as in the preceding example and tested by X-ray methods for crystal structure. It was found to be completely converted to rutile. The particle size was measured and a value of .46 for ($d_1$) was obtained; its tinting strength value was 146; its oil absorption value was 16, and it had a color value of 12.

The durability in tinted paints was tested as in Example I and the product gave durability exceeding that of the product of the preceding example. These tests, however, were not confined to the gray paint. A similarly prepared buff paint was also exposed and the same marked improvement over the control buff paint using the prior art anatase TiO₂ was also observed.

Example III

The operation of Example I was repeated using an amount of lead acetate solution equivalent to 2 kilograms of PbO. The dried product was likewise calcined at 950° C. after which it was wet ground, filtered, dried and passed through a hammer mill to effect disintegration. The product in this case was found to be converted to 100% rutile; to have a particle size average ($d_1$) of .45; a tinting strength value of 155; an oil absorption value of 17; a color value of 15; and its durability compared favorably with the product of Example II.

Example IV

A saturated lead acetate solution was added to a thick slurry of washed hydrolyzed titanium oxide containing adsorbed sulfuric acid, the lead solution being used in an amount sufficient to give 2 parts by weight of PbO per 100 parts by weight of TiO₂. The product was dried and calcined in continuous kiln equipment thereby producing a product similar to that described in Example III. The temperature of the pigment at the discharge temperature was maintained at 980° C. It was cooled, dry ground in a ring roller mill with air separation and tested in gray and buff exterior paints as was done with the products of the preceding examples. On test, its particle size average ($d_1$) was 0.48; its tinting strength value was 154; its oil absorption value was 16.2, and it had a color value of 13.

This product was also tested for durability in an automotive finish comprising a polybasic acid polyhydric alcohol resin vehicle. The pigmented composition was made using 73 parts by weight of the titanium oxide and 100 parts by weight of the binder and grinding in a ball mill for 16 hours. The white paint thus prepared was exposed on metal panels on 45° south fences in Florida along with control panels in which prior art anatase TiO₂ was used. Chalking was excessive at the end of two months in the case of the control and negligible in case of the product of this example. At the end of six months the chalking resistance of my product was still acceptable and compared favorably with a finish of the same vehicle and containing 30% prior art TiO₂ and 70% antimony oxide as the pigment.

Example V 100 kg. of calcined titanium dioxide are suspended in water as a mobile slurry and to this are added 2 kg. of litharge and 0.2 kg. of PbCl₂ and the mixed suspensions are pebble milled to obtain a smooth and uniform paste. This paste is dried and the mixture is calcined for 30 minutes at 980° C. The calcined product is finished by wet grinding, filtering, drying and pulverizing. The crystal structure of this pigment is found by X-ray diffraction methods to consist of 100% rutile TiO₂; its particle size average ($d_1$) was .48; its tinting strength value was 152; its oil absorption value was 16.1, and it had a color value of 12.

Although specific types and amounts of lead compounds have been mentioned as useful hereinabove, these are not to be considered as critical to the invention. For example, although lead oxide and such soluble lead salts as lead nitrate and acetate have been employed in the foregoing examples, other types of lead compounds will be found useful herein, such as the hydroxide, the oxalate, the carbonate, the sulfate, or any other lead salt adapted to yield the oxide by decomposition under the existing pigment calcination conditions. Again, while I preferably employ relatively minor quantities of a lead compound and sufficient to provide from about .1% to 2% of lead oxide during pigment calcination, an amount of lead compound or mixtures of the same up to, say, about 5% or as high as 10% (calculated as lead oxide) may also be employed. Thus, the calcined finished pigment may contain an amount of lead titanate ranging from .15% to 3% or as high as 15%. In instances where the lead compound used is added as a dissolved salt to the aqueous TiO₂ suspension and filtration is then had as a means of dewatering, some of the dissolved salt will be lost in the filtrate, and obviously this can be taken into consideration and compensated for at the time of salt addition.

The method of adding or incorporating the lead compound in the pigment prior to calcination is also subject to variance. While I preferably effect intimate mixing with the titanium compound by milling or agitating an aqueous thick slurry of the pigment and lead salt and a solution of the lead compound, dry mixing of the reactive ingredients may be had, if desired, provided that care is taken to effect intimate and uniform dispersion and contact of the lead compound with the titanium dioxide pigment particles prior to calcination. If desired, neutralization of a washed hydrolysis TiO₂ product with a base such as sodium carbonate, ammonium hydroxide, or sodium hydroxide, may be resorted to, the lead salt or other compound being added thereto after removal of the soluble sulfate thus formed. This modification has the advantage that the lead is not transformed into sulfate which must be decomposed during calcination. Similarly, I can subsequently precipitate the lead as the hydroxide, after its addition to the pigment slurry, by use of an alkali, preferably ammonia. This causes the lead to become insoluble and to be uniformly distributed throughout the TiO₂.

Although specific temperatures of calcination have been mentioned as utilizable, temperatures below 900° C. are not generally useful in the invention, and in order to obtain optimum benefits herein, I preferably resort to calcination temperatures in excess of 925° C. Generally, the upper range of calcination temperature should not exceed 1100° C. and preferably range up to about 1050° C. The optimum calcination temperature to be employed in any instance will be found to depend somewhat upon the amount and type of lead compound employed, as well as upon the particular color value which is desired in the ultimate pigment product. It will be found that the temperatures of calcination influence the color or brightness of the pigment product. In general, however, it will be found that the color values check the brightness values, as measured by the Hardy Spectrophotometer, and indicate that as temperatures of calcination increase, pigment color values decrease. Therefore, it may be desirable in some instances to employ the lower range of calcination temperatures indicated, in order to minimize or avoid color losses. While use of relatively high calcination temperatures effects a lowering in color and is therefore generally undesirable, it will be found that in my invention, starting with a pigment having a brightness or color of about 95% or higher, a color value of 90% or higher can be easily obtained. Thus, a pigment as satisfactorily white or bright as such extensively used pigments as basic carbonate white lead and leaded zinc oxide can be obtained, and any color loss which might arise will be tolerable, since it becomes more than offset by the improved fading and chalking resistance values which the pigment products obtained exhibit, when employed in exterior paints and automotive finishes.

While in the preferred adaptation of the invention, previously calcined and pigment-developed anatase titanium dioxide has been used in exemplification, use of precipitated uncalcined anatase titanium dioxide or of precipitated or converted rutile titanium dioxide as the reactant with the lead compounds is also contemplated and for purposes of improving their durability properties as pigments. Durability tests indicate that maximum and optimum pigment stability arises when the titanium dioxide combined with minor quantities of lead titanate crystals is in substantially 100% rutile crystalline form; and that, furthermore, such stability is notable and exceptional when the rutile titanium dioxide has been converted from its anatase modification. Where conversion to rutile has been partially effected, fading and chalking resistance characteristics exhibited by the lead treated pigment will be found to be more or less proportional to the amount of rutile present, e. g., the greater the amount of the more dense rutile crystal in the pigment, the more effective its durability characteristics. For optimum benefits hereunder, I have found it desirable to resort to such calcination temperatures as will effect conversion of the anatase to from about 90 to 100% rutile, and preferably in excess of 95%. For the purpose, it will be found desirable and preferable to utilize calcination temperatures which are not in excess of substantially 25° C. to 50° C. above the point at which complete rutile conversion becomes effected. As indicated, these effective calcination temperatures will vary with the concentration of lead compound present in the pigment and the avoidance of unduly high calcination temperatures is desired in order that no undue sacrifice in tinting strength and pigment color values will result. Thus, by limiting calcination temperatures within the degrees specified, and in accordance with extent of rutile conversion, a useful method for adopting optimum calcination temperatures hereunder is provided.

Where anatase titanium dioxide is employed as a starting material and initially subjected to calcination to first develop desired pigmentary values, this preliminary calcination is preferably conducted under such conditions as will inhibit conversion of the anatase to rutile. For the purpose, suitable conversion-inhibiting agents, such as disclosed and claimed in my copending, concurrently-filed application Serial No. 215,218, and particularly the soluble potassium sulfate or carbonate salts which are disclosed in U. S. Patent 1,892,693, may be usefully employed. Upon conclusion of calcination, the pigment-developed anatase $TiO_2$ may be suitably water-washed to extract any soluble alkali salts present therein, after which it may be recalcined and in the presence of the lead compounds of the instant invention, in order that conversion of the anatase to rutile titanium dioxide and combination therewith of relatively minor quantities of lead titanate crystals will be had.

Use of the lead compounds during titanium dioxide calcination or recalcination, in accordance with the invention, will be found distinctly advantageous and to unexpectedly and desirably influence the properties which the ultimate pigment product will exhibit, especially in respect to its uniformity, texture, particle size, as well as chalking and fading resistant characteristics. The presence of minor quantities of lead oxide during calcination, and especially during conversion of the anatase to rutile exerts a uniform increase in pigment particle size, this arising apparently by reason of the two-fold change occurring, i. e., the transformation from anatase to rutile and concurrent combination with the latter of lead titanate crystals. The temperature at which this occurs will be found to vary and depend upon the lead oxide concentration present, but will usually be in excess of 900° C. However, the higher the lead oxide concentration, the lower the effective conversion temperature, and in general the invention will provide a convenient method for controlling titanium dioxide pigment particle sizes by correlating calcination temperatures with amounts of lead oxide employed.

The influence which small amounts of lead compounds in accordance with my invention exert upon the particle size of the titanium dioxide is more clearly shown by the following table, contrasting prior art standard anatase titanium dioxide and precipitated rutile pigments with those of the instant invention. In each instance, $d_1$ represents average particle size diameters:

| No. | Percent PbO | Calc. temp. | Percent rutile | $d_1$ |
|---|---|---|---|---|
| 1 | .5 | 1000 | 70 | .37 |
| 2 | 1 | 950 | 80 | .38 |
| 3 | 2 | 950 | 100 | .43 |
| 4 | 1 | 925 | 100 | .40 |
| 5 | 1 | 975 | 100 | .45 |
| 6 | 10 | 925 | 100 | .68 |
| Std anatase $TiO_2$ | | | 0 | .29 |
| Pptd rutile $TiO_2$ | | | 100 | .26 |

From the foregoing it will be seen that the products obtained in accordance with my invention will comprise a composite pigment consisting of substantially rutile titanium dioxide, together with minor quantities of combined lead titanate crystals and with or without titanium dioxide in the crystalline form of octahedrite. The lead titanate content of said pigment will range preferably from about .15% to about 3%, and if desired to as high as about 15%. When tested in accordance with the methods already outlined, the pigments will be found to be relatively large, but of substantially uniform average $(d_1)$ particle size diameter. Thus, as indicated, prior anatase $TiO_2$ and precipitated rutile pigments have a relatively small average $(d_1)$ particle size diameter, specifically .26 and .29, respectively, whereas, in contrast thereto, my novel pigments exhibit average $(d_1)$ particle size diameters ranging from about .3 to about 2.0 microns, the major portion thereof ranging within from about .40 to about .80, which is well within the range of titanium pigment particle sizes most useful for exterior tinted paints and automotive finishes. Usually less than about 40% of the particles will average below about .3 microns, while over 95% thereof will not exceed substantially 2.0 microns.

When sizes of my novel pigments are compared with prior rutile and anatase TiO$_2$ pigments, (the rutile by corresponding determination having an average ($d_1$) diameter of about .20 to .30 microns, while more than 70% of the anatase particles are less than .3 microns, 90% thereof not exceeding .4 microns and none exceeding .8 microns), the distinction in this respect which my pigments afford is clearly evident.

It will also be found that my novel pigments possess superior hiding power and tinting strength over prior titanium dioxide pigments; and that their color values are exceptionally improved over 100% lead titanate pigments, known to be very deficient in this respect alone. The increase in hiding power and tinting strength which my pigments present is very advantageous because one is thereby permitted to formulate the paint with satisfactory one-coat hiding power or, alternatively, to incorporated the pigment in paints with more inert extenders of low cost, thus reducing the cost of such paint without incurring any sacrifice in hiding power or durability.

Again, my novel pigments possess other valuable pigmentary characteristics, particularly in respect to satisfactory oil absorption and color or brightness. For instance, when produced in accordance with my preferred operating conditions, and depending upon the temperatures of calcination and lead oxide concentrations utilized, the pigments will be found to exhibit tinting strength values ranging from about 140 to about 170. Considering that the lowest acceptable limit for a commercial and exceedingly high grade pigment is 120, this is demonstrative of the fact that my novel pigments are manifestly superior over prior pigments in this respect alone. Likewise, their oil absorption values will range from about 16 to about 20, these values decreasing as calcination temperatures increase. Thus, if desired, it is possible to obtain a decrease of 30% or more and a decrease of only about 17% will usually be effected when conversion of the titanium oxide to rutile takes place. For commercial purposes, an oil absorption value of 12 or less is not acceptable, while a value of 15 or higher is considered very desirable. Obviously, it is apparent that my novel pigments present a desired improvement in this respect also.

Durability tests in exterior house paints and automotive finishes to determine the fading and chalking resistance characteristics which my novel pigments exhibit in such formulations as against prior titanium pigments have been undertaken. It is in these fields that the white titanium oxides from prior processes have shown their inability to displace other prime pigments in spite of their superior hiding power. Excessive chalking of white automotive paints or finishes made with titanium dioxide has prevented its adoption in this field and excessive fading of tints has prevented its widespread adoption in the tinted exterior paint field.

In one series of comparative durability exposure tests, a widely-used outside house paint formulation such as that referred to was selected, while in another series an automotive finish formulation consisting of a polyhydric alcohol-polybasic acid resin was used. In each instance of test, suitable controls were employed consisting of prior TiO$_2$ pigments in the standard paint and automotive finish formulations. The automotive finish standard contained 30% titanium dioxide and 70% of antimony oxide, the latter pigment, although of much inferior hiding power, being commonly used to impart chalk resistance to prior titanium oxide pigments. Also, a 100% lead titanate pigment in a standard equal hiding power formulation was used. The panels employed in the comparative tests were exposed on vertical and 45° inclined Delaware fences facing south and also on 45° south Florida fences, as described. The Florida exposure is a greatly accelerated test by which one may determine the paint properties of a given pigment within a shortened period of time. These are almost always affirmed by the Delaware south vertical test, which is somewhat more representative of American weather conditions.

After approximately eight and one-half months' exposure, representing results on fading and chalking in respect to outside house paints (the Florida exposure being naturally more advanced) appeared:

| Pigment | Florida 45° S | | Delaware SV | |
|---|---|---|---|---|
| | Gray | Buff | Gray | Buff |
| Prior art TiO$_2$ (anatase) | 15 | 13 | 15 | 15 |
| Prior art TiO$_2$ (rutile) | 15 | 15 | 15 | 15 |
| 100 percent lead titanate | 18 | 18 | 18 | 18 |
| Rutile TiO$_2$ (1 percent PbO= 950° C.) | 8 | 0 | 5 | 1 |

From three and one-half months' Florida exposures in similar automotive finishes and house paint formulations, the following results are given, the effect of rutile and lead titanate presence in the pigment on durability characteristics of the coating composition being apparent:

(a) *Polyhydric alcohol-polybasic acid automotive finish*

| TiO$_2$ pigment | Percent PbO | Calc. temp. °C. | Percent rutile | Chalking and fading |
|---|---|---|---|---|
| 1 | 1 | 850 | 0 | 18 |
| 2 | 2 | 850 | 0 | 18 |
| 3 | 1 | 875 | 0 | 13 |
| 4 | 2 | 875 | 0 | 13 |
| 5 | 1 | 900 | 20 | 3 |
| 6 | 2 | 900 | 25 | 2 |
| 7 | 1 | 925 | 70 | 0 |
| 8 | 2 | 925 | 80 | 0 |
| 9 | 1 | 950 | 90 | 0 |
| 10 | 2 | 950 | 95 | 0 |
| 11 | 1 | 975 | 95 | 0 |
| 12 | 2 | 975 | 98 | 0 |
| 13 | 1 | 1,000 | 100 | 0 |
| 14 | 2 | 1,000 | 100 | 0 |
| 15 | 10 | 975 | 100 | 0 |
| Prior art (anatase) | | | 0 | 18 |

(b) *Exterior house paints*

| TiO$_2$ pigment | Percent PbO | Calc. temp. °C. | Percent rutile | Chalking and fading |
|---|---|---|---|---|
| 1 | 1 | 850 | 0 | 12 |
| 2 | 2 | 850 | 0 | 12 |
| 3 | 1 | 875 | 0 | 12 |
| 4 | 2 | 875 | 0 | 11 |
| 5 | 1 | 900 | 20 | 8 |
| 6 | 2 | 900 | 25 | 7 |
| 7 | 1 | 925 | 70 | 4 |
| 8 | 2 | 925 | 80 | 2 |
| 9 | 1 | 950 | 90 | 2 |
| 10 | 2 | 950 | 95 | 1 |
| 11 | 1 | 975 | 95 | 1 |
| 12 | 2 | 975 | 98 | 1 |
| 13 | 1 | 1,000 | 100 | 0 |
| 14 | 2 | 1,000 | 100 | 0 |
| Prior art (anatase) | | | 0 | 18 |

The results on chalking and fading given demonstrate the inherent superiority which the pigment of my invention will exhibit over prior titanium pigments. Thus, paints and automotive finishes made from ordinary anatase or precipitated rutile titanium dioxide and admixed with other pigments and extenders, or paints containing 100% lead titanate pigments, exhibit poor durability, i. e., pronounced and extreme fading and chalking when exteriorly exposed within a very short period of time, less than two months; whereas, my rutile titanium dioxide-lead titanate pigments exhibit comparatively no fading or chalking, even after prolonged exposure and in excess of three and one-half months' time.

Another advantage which my invention affords is that my novel calcined pigment may be directly discharged from the calciner into a quenching or cooling liquid, such as water, and the customary method of cooling the calciner discharge in air prior to slurrying in water and grinding, as previously practiced, may be dispensed with. Due to the sintering action taking place during calcination, titanium dioxide pigments are relatively hard and very difficult to grind upon discharge from the calciner. Quenching in water is avoided in prior processes because of the deleterious effect which sharp cooling has upon the color of the $TiO_2$, i. e., a blue rather than a white pigment resulting. This is thought to arise by reason of possible formation of $Ti_2O_3$ at the calcination temperature. Due to the high temperature quench, the equilibrium becomes arrested, while appreciable amounts of $Ti_2O_3$ are present. In accordance with my process I have found that a blue pigment is not produced when direct quenching of the hot pigment in water as it discharges from the calciner is resorted to. This important difference is believed to arise in a large measure by reason of the presence of the small amounts of lead compound, although this fact has not been definitely established. Irrespective of its explanation, the different behavior of the product of my invention enables me to advantageously use the quenching operation, and accordingly obtain a shattering action on the sintered pigment particles by virtue of their direct discharge from the calciner into the cold water. This is a definite aid in grinding to effect fine pigment subdivision, since, as stated, this has not been practical heretofore in titanium pigment production. By calcining the anatase $TiO_2$ in the presence of a small amount of a lead compound and then quickly cooling by direct discharge into water, optimum results accrue in the invention and I am thereby enabled to grind the otherwise hard pigment material to satisfactory fineness with but a minimum of effort. The pigment product is of satisfactory whiteness and brightness and does not possess the impaired color which accompanies similarly quenched prior art $TiO_2$ pigments.

In addition to its adaptability for use in all types of coating composition formulations, my novel pigment will be found especially useful for delustering rayon, whereby fade resistant dyed fabrics can be produced therefrom. This fading of $TiO_2$ pigments in rayon is not similar to that which exists in colored paints, for the reason that in the rayon the dye itself becomes bleached, while in paints fading arises due to accumulation of the titanium oxide particles on the surface of the paint film as a chalk, to obscure the true paint color beneath. My novel pigment is therefore adapted for use in all types of rayon, not only in the viscose variety, but also in acetate fibers and fabrics.

It will be understood that the term "titanium dioxide" here and in the appended claims is used in its broadest sense and comprises not only titanium dioxide per se, but titanium dioxide suitably modified by either precipitated, blended or coalesced alkaline earth metal sulfate extenders, such as those of barium or calcium, or with other types of extenders, such as silica, magnesium silicate, or the silicates in general.

I claim as my invention:

1. A process for producing a stable, weather-resistant rutile titanium dioxide pigment, comprising calcining titanium dioxide at a temperature in excess of 900° C. in the presence of a small amount of a compound of lead from the group consisting of an oxide or compound which under the prevailing calcination conditions yields an oxide.

2. A process for producing a stable, weather-resistant rutile titanium dioxide pigment comprising recalcining pigment titanium dioxide at a temperature in excess of 900° C. in the presence of a small amount of a compound of lead from the group consisting of an oxide or compound which under the prevailing calcination conditions yields an oxide.

3. A process for producing a stable, weather-resistant titanium dioxide pigment comprising calcining at a temperature in excess of 900° C. pigment developed anatase titanium dioxide to its rutile modification in the presence of a small amount of a compound of lead from the group consisting of an oxide or compound which under the prevailing calcination conditions yields an oxide.

4. A process for producing a stable, weather-resistant titanium dioxide pigments comprising initially calcining anatase titanium dioxide at a temperature in excess of substantially 900° C. and in the presence of a soluble alkali salt adapted to inhibit its conversion to rutile, and thereafter recalcining the resultant pigment and effecting rutile conversion in the presence of a small amount of a compound of lead from the group consisting of an oxide or compound which under the prevailing calcination conditions yields an oxide.

5. A process for producing stable, weather-resistant rutile titanium dioxide pigments comprising calcining titanium dioxide at a temperature in excess of 900° C. in the presence of a small amount of lead oxide.

6. A process for producing stable, weather-resistant rutile titanium dioxide pigments comprising calcining titanium dioxide at a temperature in excess of 900° C. in the presence of a small amount of in-situ-formed lead oxide.

7. A process for producing stable, weather-resistant rutile titanium dioxide pigments comprising calcining titanium dioxide at a temperature in excess of 900° C. in the presence of .1% to 10% of lead oxide.

8. A process for producing stable, weather-resistant titanium dioxide pigments comprising initially calcining anatase titanium dioxide at a temperature in excess of substantially 900° C. and in the presence of a soluble alkali salt adapted to inhibit its conversion to rutile, and thereafter recalcining the resultant product and effecting rutile conversion in the presence of a small amount of lead oxide.

9. A stable titanium dioxide pigment of improved chalking and fading resistant characteristics, comprising rutile titanium dioxide intimately associated through co-calcination with small amounts of lead titanate.

10. A stable titanium dioxide pigment of improved chalking and fading resistant characteristics comprising anatase converted rutile titanium dioxide intimately associated through co-calcination with about .15% to about 15% of lead titanate.

11. A stable titanium dioxide pigment of improved chalking and fading resistant characteristics comprising rutile titanium dioxide intimately associated through co-calcination with from .15 to 15% of lead titanate, the particle size average of said titanium dioxide pigment ranging from about .3 to 2.0 microns diameter.

12. A stable titanium dioxide pigment of improved chalking and fading resistant characteristics comprising rutile titanium dioxide combined with small amounts of lead titanate, the particle size average of said titanium dioxide pigment ranging from about .3 to 2.0 microns diameter.

13. A stable titanium dioxide pigment of improved chalking and fading resistant characteristics comprising rutile titanium dioxide combined with about .15% to 3% of lead titanate, the particle size average of said titanium dioxide pigment ranging from about .3 to 2.0 microns diameter.

14. A process for producing a stable, weather-resistant, rutile titanium dioxide pigment comprising calcining titanium dioxide at a temperature of at least 925° C., but not exceeding 1100° C., in the presence of a small amount of a compound of lead from the group consisting of an oxide or compound which under the prevailing calcination conditions yields an oxide.

15. A process for producing a stable, weather-resistant rutile titanium dioxide pigment comprising calcining titanium dioxide at a temperature ranging from about 925° C. to about 1050° C. in the presence of from about .1% to 2% of a compound of lead from the group consisting of an oxide or compound, which under the prevailing calcination conditions yields an oxide.

JAMES ELIOT BOOGE.